United States Patent
Wang

(10) Patent No.: US 9,605,748 B2
(45) Date of Patent: Mar. 28, 2017

(54) PLANETARY HOLLOW ROTATING PLATFORM STRUCTURE

(71) Applicant: Gumptious Technology Co., Taichung (TW)

(72) Inventor: Terry Wang, Taichung (TW)

(73) Assignee: GUMPTIOUS TECHNOLOGY CO., Taichung (TW)

( * ) Notice: Subject to any disclaimer, the term of this patent is extended or adjusted under 35 U.S.C. 154(b) by 168 days.

(21) Appl. No.: 14/732,280

(22) Filed: Jun. 5, 2015

(65) Prior Publication Data

US 2016/0123458 A1 May 5, 2016

(30) Foreign Application Priority Data

Oct. 29, 2014 (TW) .............. 103219100 U

(51) Int. Cl.
  *F16C 19/36* (2006.01)
  *F16H 57/08* (2006.01)
(52) U.S. Cl.
  CPC ............ *F16H 57/08* (2013.01); *F16C 19/362* (2013.01)
(58) Field of Classification Search
  CPC .. F16C 2361/65; F16C 19/166; F16C 19/362; F16C 35/04–35/045; F16H 2200/2097
  See application file for complete search history.

(56) References Cited

U.S. PATENT DOCUMENTS

| 4,196,947 A | * | 4/1980 | Ziegler | ............... B60B 33/0002 384/592 |
| 8,596,158 B2 | * | 12/2013 | Xu | ......... F16C 19/362 74/412 R |
| 8,616,775 B2 | * | 12/2013 | Watanabe | ................ G01B 7/30 310/90 |
| 8,875,598 B2 | * | 11/2014 | Horiuchi | ............... F16H 49/001 74/640 |
| 9,182,070 B2 | * | 11/2015 | Shannahan | .......... F16M 11/043 |
| 2004/0048715 A1 | * | 3/2004 | Shirasawa | ............... F16H 57/08 475/254 |
| 2008/0164785 A1 | * | 7/2008 | Wang | .................... F16C 19/362 310/68 B |

* cited by examiner

*Primary Examiner* — Thomas R. Hannon
(74) *Attorney, Agent, or Firm* — Ming Chow; Sinorica, LLC

(57) ABSTRACT

Disclosed is a planetary hollow rotating platform structure including a force output shaft installed at a cross bearing and a deceleration mechanical device with a single bearing. The structure has the effects of reducing the number of required components and the volume of the structure to simplify the structural complexity and reduce the occupied space and volume.

3 Claims, 6 Drawing Sheets

PLANETARY HOLLOW ROTATING PLATFORM STRUCTURE

The current application claims a foreign priority to application number 103219100 filed on Oct. 29, 2014 in Taiwan.

TECHNICAL FIELD

The present invention relates to the technical field of a planetary hollow rotating platform structure, in particular to the planetary hollow rotating platform structure applied to a deceleration mechanical device with a stable driving effect.

BACKGROUND OF THE INVENTION

In general, a conventional deceleration driving device comprises a motor, an input end, an output end, a reduction gear set, a workpiece carrying tray and a transmission member, wherein the transmission member is a belt or a chain, and the input end and the output end are disposed on two opposite sides of the reduction gear set respectively, and the input end is coupled to the motor, and the output end is coupled to the transmission member and a workpiece carrying tray (not shown in the figure), and a set of bearings installed at the front and rear of the reduction gear set separately. The motor is driven to drive the input end to rotate at a high speed, and the reduction gear set is provided for decelerating the rotating speed to provide a lower rotating speed to the output end for driving the transmission member, while linking the workpiece carrying tray to rotate at a low speed. However, the conventional deceleration driving device has the following problems:

1. High Structural Complexity: The deceleration driving device comprises a motor, an input end, an output end, a reduction gear set, a workpiece carrying tray and a transmission member, and both of the front and rear of the reduction gear set require a set of bearings, so that the structure of the whole assembly is relatively more complicated, and the structural complexity is high.

2. Large Occupied Space and Volume: The deceleration driving device comprises a motor, an input end, an output end, a reduction gear set, a workpiece carrying tray and a transmission member, and both of the front and rear of the reduction gear set require a set of bearings, so that the whole structural assembly comes with a large volume, and the occupied space and volume are large.

SUMMARY OF THE INVENTION

In view of the aforementioned problems of the conventional deceleration driving device including high structural complexity and large occupied space and volume, it is a primary objective of the present invention to provide a planetary hollow rotating platform structure to solve the problems.

To achieve the aforementioned objective, the present invention provides a planetary hollow rotating platform structure, comprising a force output base, a force output shaft and a bearing platen. The force output base includes a restrictive shaft hole penetrating through the center of the force output base, a step ring portion extended outwardly from a side of the restrictive shaft hole, a first step ring groove and a second step ring groove formed inside the step ring portion, and a plurality of position locking holes formed around the step ring portion and penetrating through a front surface of the step ring portion. In addition, the force output shaft includes a plurality of position combining holes formed around a front surface of the force output shaft, a receiving slot formed at and penetrating through the centre of the force output shaft, a bearing engaging portion disposed around the force output shaft, a cross bearing engaged with the bearing engaging portion, a positioning ring groove formed at the rear of the bearing engaging portion, a C-shape fastening ring latched into the positioning ring groove for positioning and fixing the cross bearing to the bearing engaging portion. The bearing platen includes a restrictive opening formed at and penetrating through the center of the bearing platen, a circular groove concavely formed on a side of the restrictive opening and facing inward, an oil seal installed in the circular groove, a plurality of position restricting holes being penetrating holes formed around bearing platen, a position restrictive locking member passing through the respective position restricting hole, and the bearing platen being covered onto the outer side of the step ring portion of the force output base, and the plurality of position restricting holes being configured to be corresponsive to the plurality of position locking holes formed on the outer side of the step ring portion of force output base respectively and fixed by the position restrictive locking members installed in the plurality of position restricting holes respectively. With the cross bearing of the force output shaft, the deceleration mechanical module combined with the force output base just requires a single bearing to reduce the number of required components and the volume, so as to achieve the effects of simplifying the structural complexity and reducing the occupied space and volume.

DESCRIPTION OF THE PREFERRED EMBODIMENTS

The present invention will become clearer in light of the following detailed description of an illustrative embodiment of this invention described in connection with the drawings. It is intended that the embodiments and drawings disclosed herein are to be considered illustrative rather than restrictive.

Figure 1:
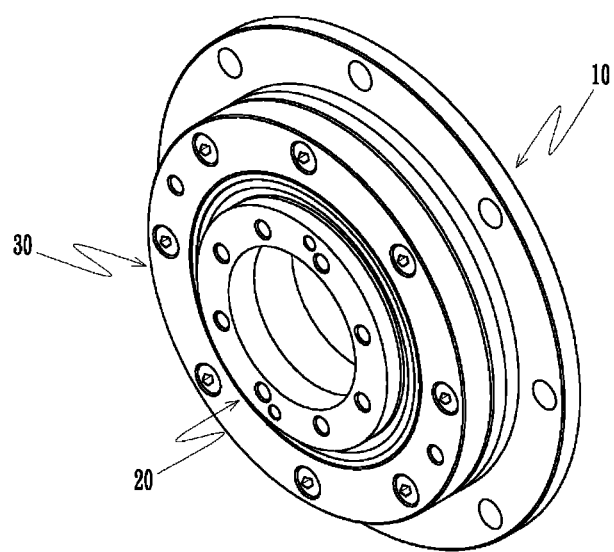
FIG. 1 is a perspective view of the present invention.
Figure 2:
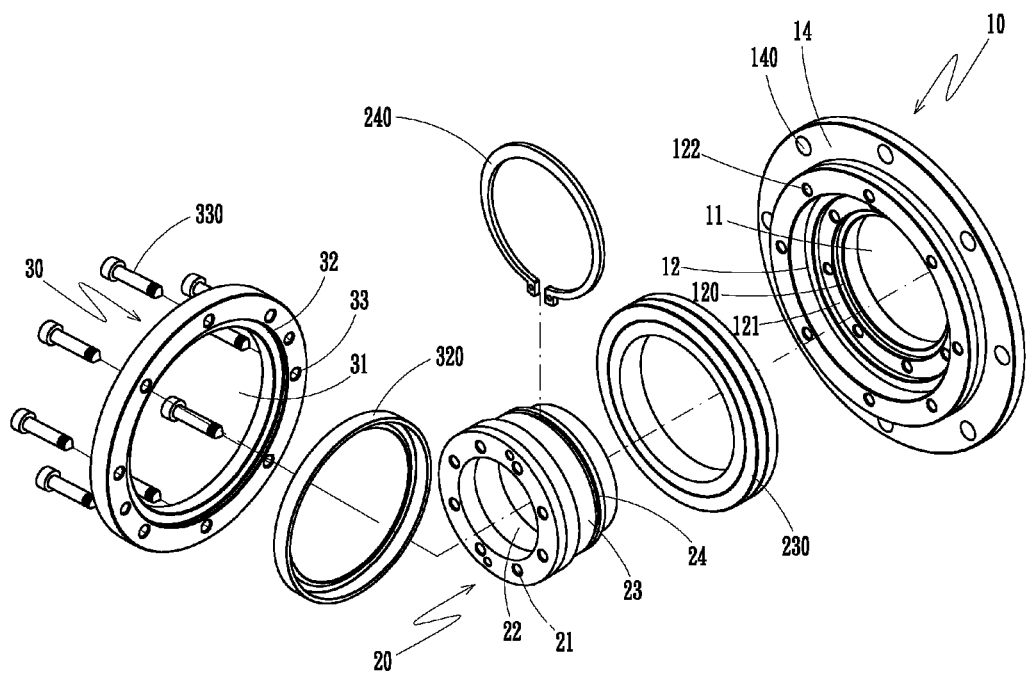
FIG. 2 is an exploded view of the present invention.
Figure 3:
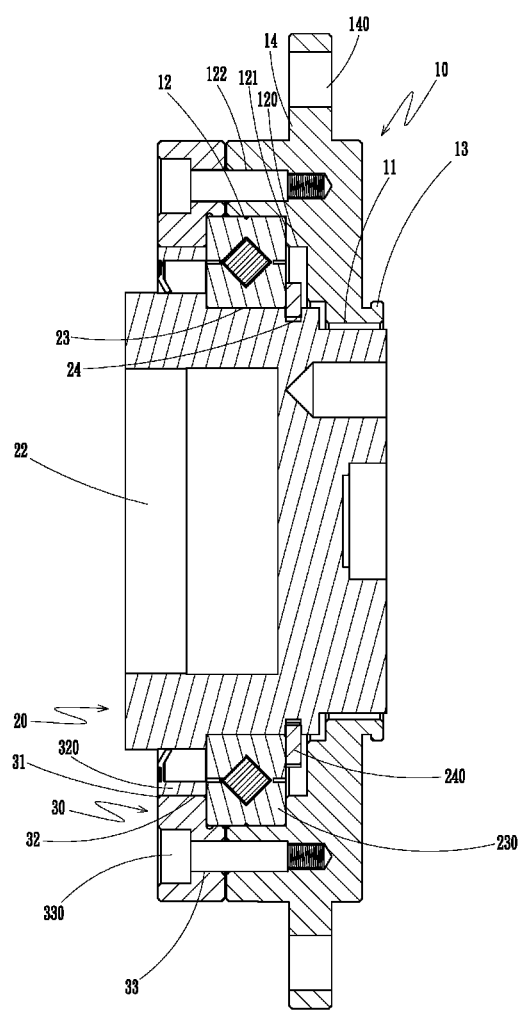
FIG. 3 is a cross-sectional side view of the present invention.
Figure 4:
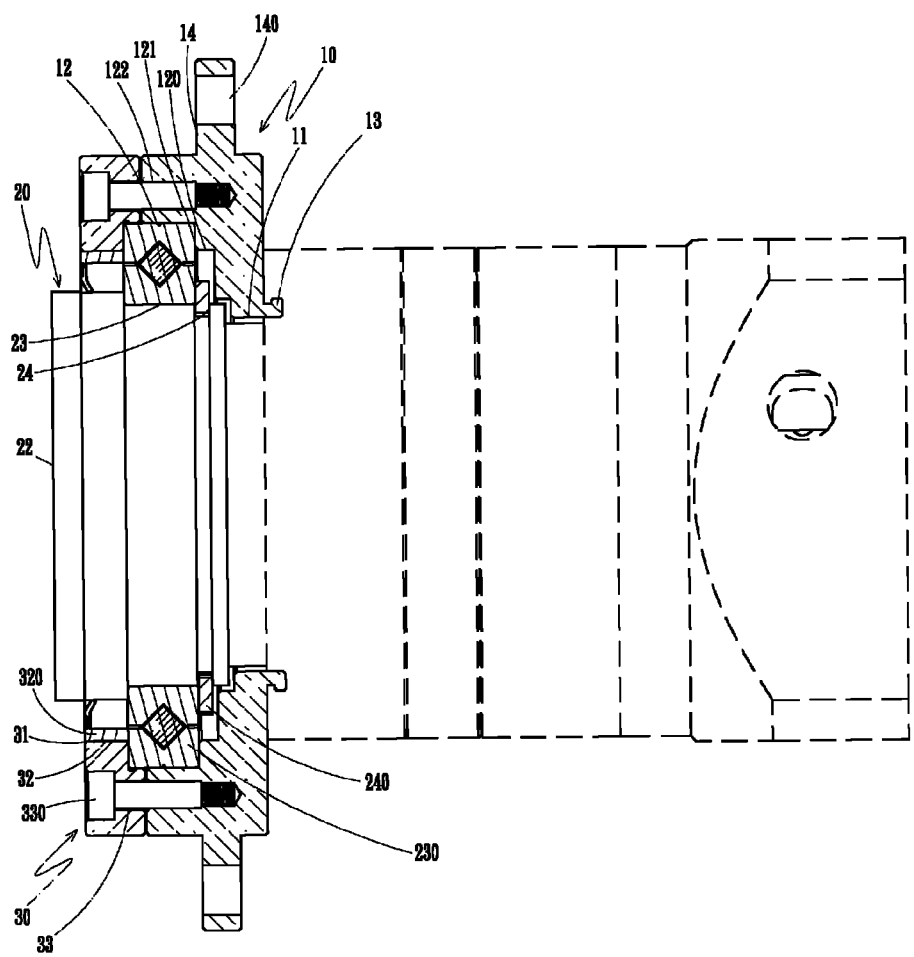
FIG. 4 shows a cross-sectional side view of the present invention and a schematic view of the present invention combined with a deceleration mechanical module.
Figure 5:
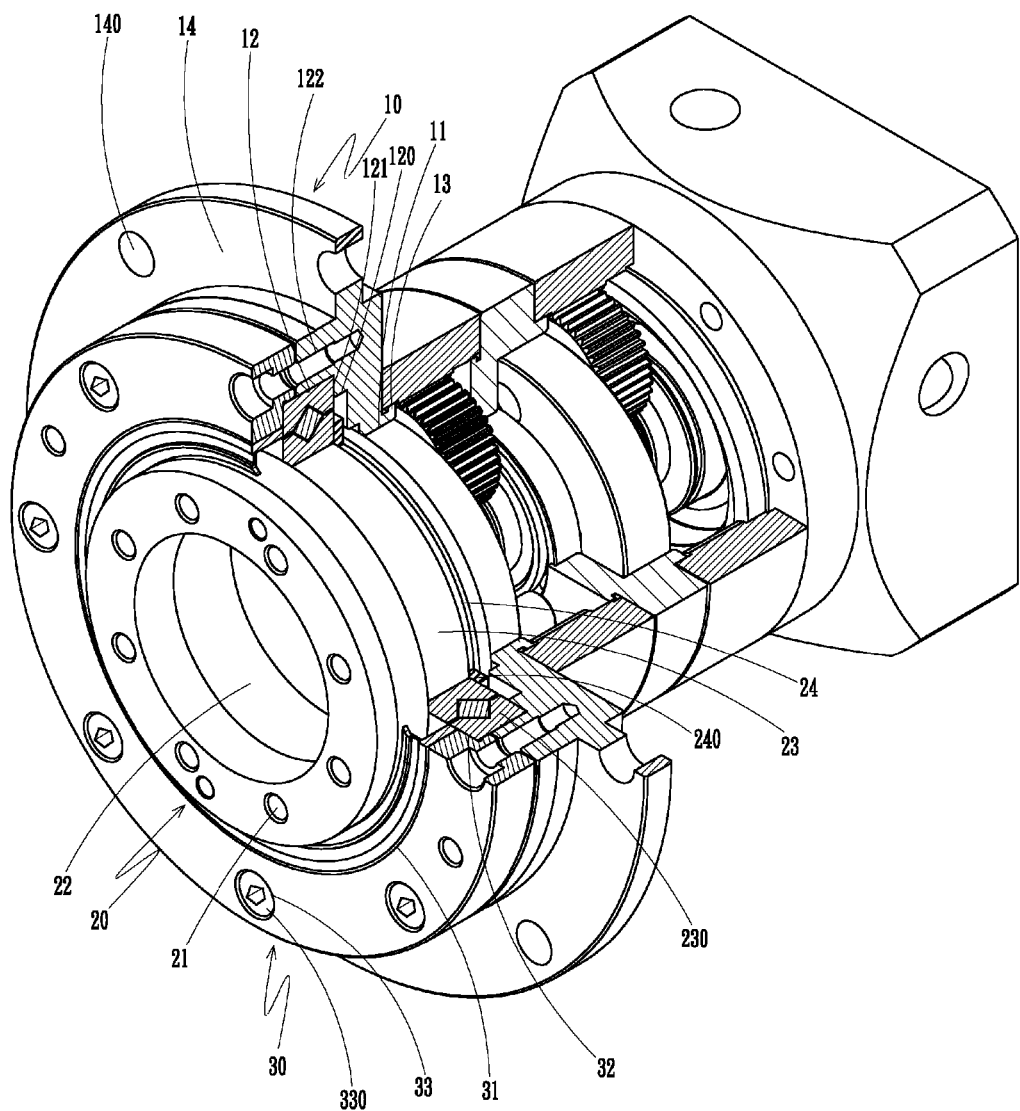
FIG. 5 shows a partial cross-sectional view of the present invention and a schematic view of the present invention combined with a deceleration mechanical module.
Figure 6:
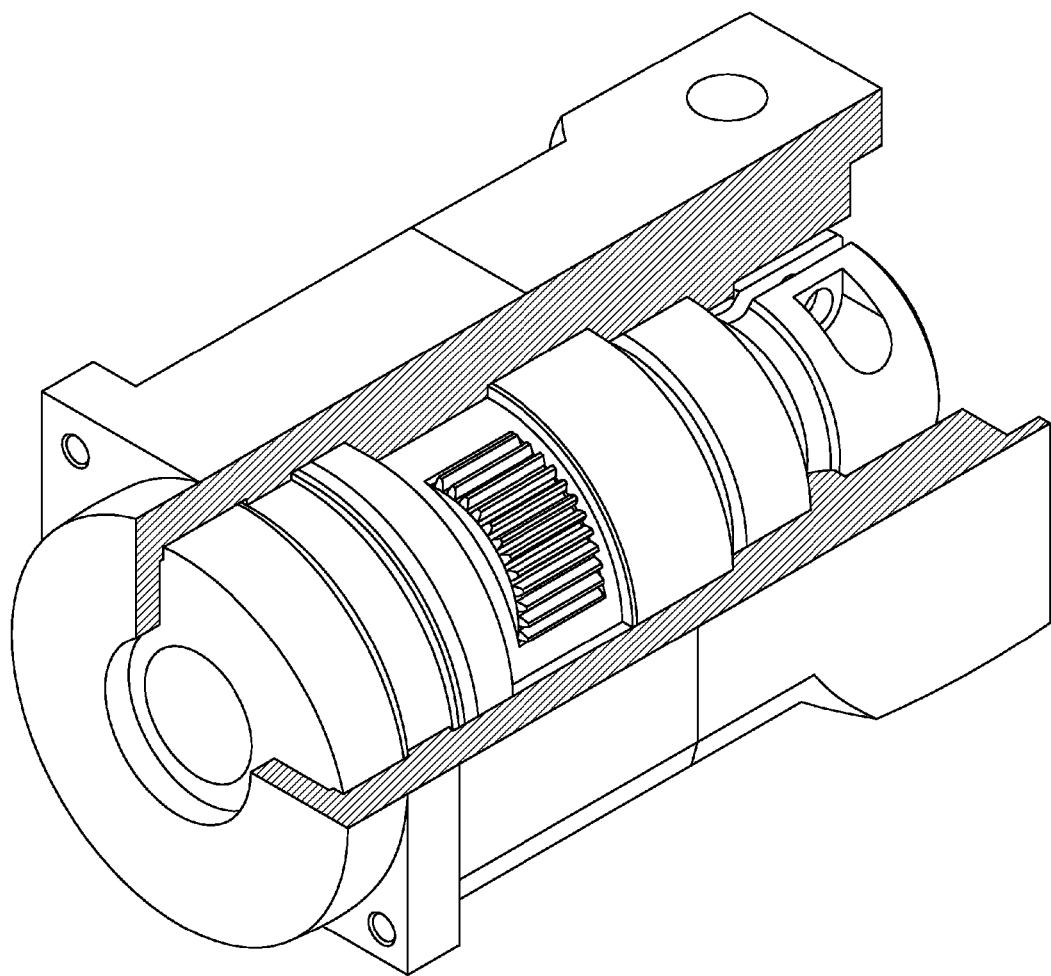
FIG. 6 is a partial cross-sectional view of a conventional deceleration driving device.

With reference to FIGS. 1 to 3 for a perspective view, an exploded view and a cross-sectional side view of a planetary hollow rotating platform structure of the present invention respectively, the planetary hollow rotating platform structure comprises the following elements:

A force output base 10 includes a restrictive shaft hole 11 penetrating through the center of the force output base 10, a step ring portion 12 extended outwardly from a side of the restrictive shaft hole 11, a first step ring groove 120 and a second step ring groove 121 formed in the step ring portion 12, a plurality of position locking holes 122 formed on and penetrating through a front surface of the step ring portion 12, a position fixing ring portion 13 disposed on a side without the restrictive shaft hole 11 and facing outward, and an outer ring 14 installed on an outer side of the step ring portion 12 of the force output base 10 and having a plurality of positioning holes 140 passing through the outer ring 14.

A force output shaft 20 includes a plurality of position combining holes 21 formed around a front surface of the force output shaft 20, and a receiving slot 22 penetrating through the center of the force output shaft 20, a bearing engaging portion 23 disposed around the force output shaft 20, a cross bearing 230 engaged with the bearing engaging portion 23, a positioning ring groove 24 formed at the rear of the bearing engaging portion 23, a C-shape fastening ring 240 engaged into the positioning ring groove 24 for positioning and fixing the cross bearing 230 to the bearing engaging portion 23, and an end of the force output shaft 20 being engaged with the restrictive shaft hole 11 of the force output base 10, and the C-shape fastening ring 240 of the positioning ring groove 24 is provided for positioning and receiving the first step ring groove 120 of the step ring portion 12 of the force output base 10, and the cross bearing 230 of the bearing engaging portion 23 is received into the second step ring groove 121 of the step ring portion 12 of the force output base 10.

A bearing platen 30 includes a restrictive opening 31 penetrating through the bearing platen 30, a circular groove 32 concavely formed on a side of the restrictive opening 31 and facing inward, an oil seal 320 installed in the circular groove 32, a plurality of position restricting holes 33 formed around and penetrating through the bearing platen 30, and a position restrictive locking member 330 installed in one of the respective position restricting holes, wherein the bearing platen 30 is covered onto an outer side of the step ring portion 12 of the force output base 10, and the plurality of position restricting holes 33 are configured to be corresponsive to the plurality of position locking holes 122 formed on the outer side of the step ring portion 12 of the force output base 10 and locked and fixed by the position restrictive locking member 330 installed in the plurality of position restricting holes 33 respectively.

The aforementioned components are assembled to form the planetary hollow rotating platform structure of the present invention.

With reference to FIGS. 2 to 5 for an exploded view and a cross-sectional side view and of a planetary hollow rotating platform structure of the present invention and a side view and a partial cross-sectional view of the planetary hollow rotating platform structure combined with a deceleration mechanical module in accordance with the present invention respectively, an end of the force output shaft 20 is engaged with the restrictive shaft hole 11 of the force output base 10, and the C-shape fastening ring 240 of the positioning ring groove 24 of the force output shaft 20 is provided for positioning and receiving the first step ring groove 120 of the step ring portion 12 of the force output base 10, and the cross bearing 230 of the bearing engaging portion 23 of the force output shaft 20 is received into the second step ring groove 121 of the step ring portion 12 of the force output base 10, and the bearing platen 30 is covered onto the outer side of the step ring portion 12 of the force output base 10, and the plurality of position restricting holes 33 of the bearing platen 30 are configured to be corresponsive to the plurality of position locking holes 122 of the step ring portion 12 of the force output base 10 and locked and fixed by the position restrictive locking members 330 of the plurality of position restricting holes 33 respectively. With the cross bearing 230 of the force output shaft 20, the deceleration mechanical module combined with the force output base 10 just requires a single bearing to reduce the number of required components and the volume, so as to achieve the effects of simplifying the structural complexity and reducing the occupied space and volume.

What is claimed is:

1. A planetary hollow rotating platform structure, comprising:

a force output base, including a restrictive shaft hole penetrating through the center of the force output base, a step ring portion extended outwardly from a side of the restrictive shaft hole, a first step ring groove and a second step ring groove formed inside the step ring portion, and a plurality of position locking holes formed around the step ring portion and penetrating through a front surface of the step ring portion;

a force output shaft, including a plurality of position combining holes formed around a front surface of the force output shaft, a receiving slot formed at and penetrating through the centre of the force output shaft, a bearing engaging portion disposed around the force output shaft, a cross bearing engaged with the bearing engaging portion, a positioning ring groove formed at the rear of the bearing engaging portion, a C-shape fastening ring latched into the positioning ring groove for positioning and fixing the cross bearing to the bearing engaging portion, and an end of the force output shaft being positioned and engaged with the restrictive shaft hole of the force output base, and the C-shape fastening ring of the positioning ring groove being positioned and received in the first step ring groove of the step ring portion of the force output base, and the cross bearing of the bearing engaging portion being received in the second step ring groove of the step ring portion of the force output base; and a bearing platen, including a restrictive opening formed at and penetrating through the center of the bearing platen, a circular groove concavely formed on a side of the restrictive opening and facing inward, an oil seal installed in the circular groove, a plurality of position restricting holes being penetrating holes formed around bearing platen, a position restrictive locking member passing through the respective position restricting hole, and the bearing platen being covered onto the outer side of the step ring portion of the force output base, and the plurality of position restricting holes being configured to be corresponsive to the plurality of position locking holes formed on the outer side of the step ring portion of force output base respectively and fixed by the position restrictive locking members installed in the plurality of position restricting holes respectively.

2. The planetary hollow rotating platform structure as claimed in claim 1, wherein the force output base includes a position fixing ring portion disposed on the other side without the restrictive shaft hole and facing outward.

3. The planetary hollow rotating platform structure as claimed in claim 1, wherein the force output base includes an outer ring disposed on an outer side of the step ring portion, and the outer ring includes a plurality of positioning holes which are penetrating holes.

* * * * *